(12) United States Patent
Chuang et al.

(10) Patent No.: US 8,629,859 B2
(45) Date of Patent: Jan. 14, 2014

(54) ELECTROPHORETIC DISPLAY APPARATUS AND METHOD FOR MANUFACTURING THE SAME AND METHOD FOR DRIVING THE SAME

(75) Inventors: Kai-Cheng Chuang, Hsinchu (TW); Tzu-Ming Wang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 448 days.

(21) Appl. No.: 12/985,750

(22) Filed: Jan. 6, 2011

(65) Prior Publication Data

US 2012/0038598 A1 Feb. 16, 2012

(30) Foreign Application Priority Data

Aug. 13, 2010 (TW) .............................. 99127210 A

(51) Int. Cl.
*G09G 5/00* (2006.01)
(52) U.S. Cl.
USPC .............................. 345/204; 345/107; 427/75
(58) Field of Classification Search
USPC .......................................... 345/204; 359/296
See application file for complete search history.

(56) References Cited

U.S. PATENT DOCUMENTS

| 5,298,432 | A | 3/1994 | Sayyah | |
|---|---|---|---|---|
| 6,445,489 | B1 | 9/2002 | Jacobson et al. | |
| 6,753,999 | B2 | 6/2004 | Zehner et al. | |
| 2003/0011868 | A1* | 1/2003 | Zehner et al. | 359/296 |
| 2007/0237546 | A1* | 10/2007 | Zona et al. | 399/168 |
| 2008/0174852 | A1* | 7/2008 | Hirai et al. | 359/296 |

OTHER PUBLICATIONS

State Intellectual Property Office of the People'S Republic of China, "Office Action", Apr. 2, 2013, China.

* cited by examiner

*Primary Examiner* — Amare Mengistu
*Assistant Examiner* — Joseph G Rodriguez
(74) *Attorney, Agent, or Firm* — WPAT, PC; Justin King

(57) ABSTRACT

An electrophoretic display device includes an electrophoretic displaying layer, a photoconductive layer and a top electrode layer. The electrophoretic displaying layer includes a number of pixels. The top electrode layer and the photoconductive layer are respectively disposed at two opposite sides of the electrophoretic displaying layer. The photoconductive layer includes a number of photoconductive units spaced apart from each other. Each of the pixels corresponds to at least one photoconductive units. The present invention also provides a method for manufacturing the electrophoretic display device and a method for driving the electrophoretic display device.

12 Claims, 3 Drawing Sheets

ELECTROPHORETIC DISPLAY APPARATUS AND METHOD FOR MANUFACTURING THE SAME AND METHOD FOR DRIVING THE SAME

FIELD OF THE INVENTION

The present invention relates to a display device, and more particularly to an electrophoretic display device, a method for manufacturing the electrophoretic display device and a method for driving the electrophoretic display device.

BACKGROUND OF THE INVENTION

Electrophoretic display devices have been widely applied to electronic papers because the electrophoretic display devices have characteristics of bistable display paper-like effect, low cost and flexibility. In addition, the electrophoretic display devices can also be used in large scale display devices. However, it is difficult for the electrophoretic display devices to be driven by an easy and cost-effective driving method.

Conventionally, a direct driving method is used in an electrophoretic display device. In the direct driving method, each pixel is controlled by an external driving circuit. Thus, the direct driving method has a high cost, and is not applicable to the electrophoretic display device having great amount of pixels or the electrophoretic display device whose pixels are tightly packaged together. Additionally, an active matrix driving method is also used in the electrophoretic display device. In the active matrix driving method, an active matrix including a number of nonlinear elements such as transistors, diodes, or rheostats is formed on a substrate of the electrophoretic display device to control the pixels. The active matrix driving method is a well-developed technology and has been widely used in liquid crystal display devices. However, the active matrix driving method still has a high cost. Moreover, it is difficult to form the active matrix on a plastic substrate which is widely used in the electrophoretic display device.

Besides, the electrophoretic display device utilizes an electric field to control the movements of displaying particles, and thus there is not a specific controlling threshold voltage. In other words, even if the electric potential of the pixel electrode is at a low level the pixel corresponding to the pixel electrode would still displays. It is noted that, generally, the low level electric potential of the pixel electrode maybe mean that the pixel corresponding to the pixel electrode should be off. Therefore, the contrast of the electrophoretic display device using the direct driving method or the active matrix driving method will be decreased.

Accordingly, what is needed is to provide an electrophoretic display device having an easy driving method and a high contrast.

SUMMARY OF THE INVENTION

The present invention provides an electrophoretic display device which can be driven easily and has a high contrast.

The present invention also provides a method for manufacturing the electrophoretic display device. The electrophoretic display device manufactured can be driven easily and has a high contrast.

The present invention further provides a method for driving the electrophoretic display device, which is an easy and cost-effective method to drive the electrophoretic display device.

The present invention provides an electrophoretic display device including an electrophoretic displaying layer, a photoconductive layer and a top electrode layer. The electrophoretic displaying layer includes a number of pixels. The top electrode layer and the photoconductive layer are respectively disposed at two opposite sides of the electrophoretic displaying layer. The photoconductive layer includes a number of photoconductive units spaced apart from each other. The photoconductive layer includes a number of photoconductive units. Each of the pixels corresponds to at least one of the photoconductive units.

The present invention also provides a method for manufacturing an electrophoretic display device, which includes the following steps. An electrophoretic displaying layer having a number of pixels is provided. A photoconductive layer is formed on a surface of the electrophoretic displaying layer. A top electrode layer is formed on another surface of the electrophoretic displaying layer. The photoconductive layer includes a number of photoconductive units spaced apart from each other. Each of the pixels corresponds to at least one of the photoconductive units.

The present invention further provides a method for driving the above mentioned electrophoretic display device. In the driving method the photoconductive layer is irradiated with a light beam having a predetermined pattern so that the photoconductive units irradiated by the light beam transform into electrical conductors, thereby driving the corresponding pixels to display a predetermined image.

In one embodiment provided by the present invention, the top electrode layer is a transparent electrode layer.

In one embodiment provided by the present invention, the electrophoretic display device further includes a bottom electrode layer formed beneath the photoconductive layer, and a top photoconductive layer disposed between the top electrode layer and the electrophoretic displaying layer. The bottom electrode layer includes a number of electrically conductive portions corresponding to the photoconductive units of the photoconductive layer respectively.

In one embodiment provided by the present invention, a gap between two adjacent photoconductive units of the photoconductive units is filled with a dielectric material.

In one embodiment provided by the present invention, the electrophoretic display device further includes a transparent substrate, and the photoconductive layer is formed on the transparent substrate.

In one embodiment provided by the present invention, the electrophoretic display device further includes a button for controlling an erasing operation to erase what the electrophoretic display device displays.

The electrophoretic display device of the present invention utilizes the light beam to indirectly control what the electrophoretic displaying layer displays. The driving method is very simple. Compared with the electrophoretic display device using a thin film transistor array to control what the electrophoretic displaying layer displays, the contrast is higher. In addition, the display controlling elements such as the thin film transistor array is omitted in the electrophoretic display device, the electrophoretic display device becomes simpler and thinner.

BRIEF DESCRIPTION OF THE DRAWINGS

Above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
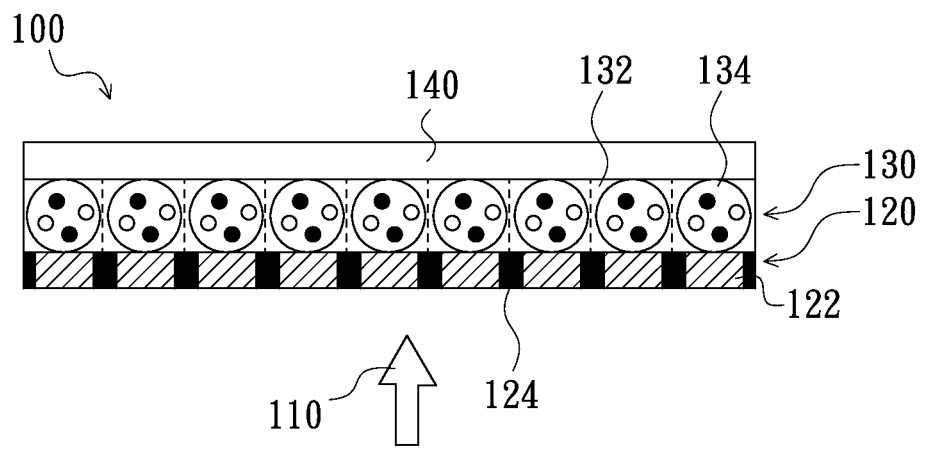
FIG. 1 is a cross-sectional, schematic view of an electrophoretic display device in accordance with a first embodiment.

FIG. 1 is a cross-sectional, schematic view of an electrophoretic display device in accordance with a first embodiment. Referring to FIG. 1, an electrophoretic display device 100 includes a photoconductive layer 120, an electrophoretic displaying layer 130, and a top electrode layer 140. The top electrode layer 140 and the photoconductive layer 120 are respectively disposed at two opposite sides of the electrophoretic displaying layer 130.

Figure 2:
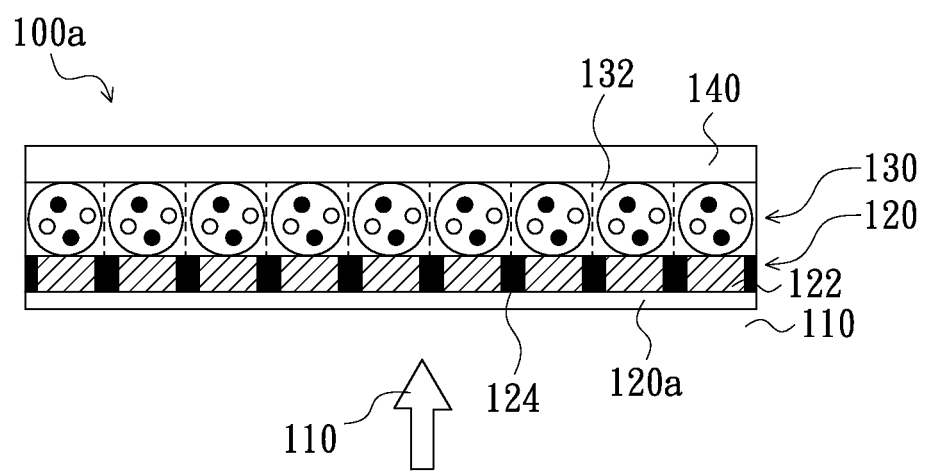
FIG. 2 is a cross-sectional, schematic view of an electrophoretic display in accordance with a first embodiment.

The photoconductive layer 120 can be made of a material selected from a group consisting of, for example, an organic photoconductive polymer, a dye-aggregate photoreceptor and a pigment-based photoreceptor. The material for the photoconductive layer 120 is an insulator in a dark environment, and transforms into an electrical conductor after being irradiated by a light beam. In the present embodiment, the photoconductive layer 120 is made of 2,4,7-trinitron-9-fluorenone. The photoconductive layer 120 includes a number of photoconductive units 122 spaced apart from each other. The photoconductive units 122 and the top electrode layer 140 can be respectively electrically connected to a power supply (not shown). A gap between two adjacent photoconductive units 122 can be filled with a dielectric material 124 such as epoxy resin. The epoxy resin can further includes a number of black pigment particles so that a light beam 110 from a light emitting layer can be prevented from emitting through the electrophoretic displaying layer 130. Thus, the epoxy resin is black, thereby increasing the contrast of the electrophoretic displaying layer 130. In addition, as shown in FIG. 2, in another embodiment, the photoconductor layer 120 can also be formed on a transparent substrate 120a. The transparent substrate 120a can be, for example, a glass substrate or a polyester substrate.

The electrophoretic displaying layer 130 can be a microcapsule electrophoretic displaying layer or a micro-cup electrophoretic displaying layer. The electrophoretic displaying layer 130 includes a number of pixels 132. In the present embodiment, each of the pixels 132 includes at least one electrophoretic displaying unit 134. However, in other embodiments, one electrophoretic displaying unit 134 can correspond to a number of pixels. In the circumstances, each of the pixel 132 is configured for controlling a partial area of the electrophoretic displaying unit 134 to changes in color. The electrophoretic displaying unit 134 can be, for example, a micro-capsule electrophoretic displaying unit or a microcup electrophoretic displaying unit. In the present embodiment, the electrophoretic displaying unit 134 is a microcapsule electrophoretic displaying unit. The electrophoretic displaying unit 134 can display different status according to a voltage applied between the photoconductive unit 122 and the top electrode layer 140.

In the present embodiment, the photoconductive units 122 of the photoconductive layer 120 correspond to the pixels 132 of the electrophoretic displaying layer 130 one by one. Each photoconductive unit 122 is configured for controlling one corresponding pixel 132. However, the corresponding relationship of the photoconductive units 122 and the pixels 132 is not limited by the present embodiment. For example, a number of photoconductive units 122 can correspond to one pixel 132 to control the one corresponding pixel 132. In addition, to achieve a colorful display effect, the pixels 132 can include sub-pixels of different colors (for example, red, green and blue). Each sub-pixel is controlled by at least one photoconductive unit 122.

The top electrode layer 140 can be, for example, a transparent electrode layer such as a glass electrode layer, a transparent polymer electrode layer, or an indium tin oxide (ITO) electrode layer. Each of the glass electrode layer and the transparent polymer electrode layer can further be coated with an electrically conductive compound such as indium tin oxide.

The electrophoretic display device 100 of the present embodiment can be driven by the following method to display a predetermined image. Firstly, the light beam 110 having a predetermined pattern is irradiated to the photoconductive layer 120. The electrical resistance of the photoconductive units 122 decreases due to the irradiation of the light beam 110. Thus, the photoconductive units 122 can transform from insulators into electrical conductors. Thus, an electric field can be formed between the conductive photoconductive units 122 and the top electrode layer 140. The corresponding pixels 132 are driven by the electric field, thereby displaying a corresponding status. As a result, the electrophoretic displaying layer 130 displays the predeterminded image in accordance with the predetermined pattern of the light beam 110. Because the electrophoretic displaying layer 130 is indirectly controlled by the light beam 110 and the light beam 110 can be provided with a light emitting apparatus (such as a projector) that is easy to be controlled, the electrophoretic displaying layer 130 can be driven using an easy driving method. Compared with the electrophoretic display device using a thin film transistors array to control the pixels to display, the contrast of the electrophoretic displaying layer 130 is higher. In addition, the display controlling elements such as the thin film transistor array is omitted in the electrophoretic display device 100, the electrophoretic display device 100 becomes simpler and thinner.

Figure 3:
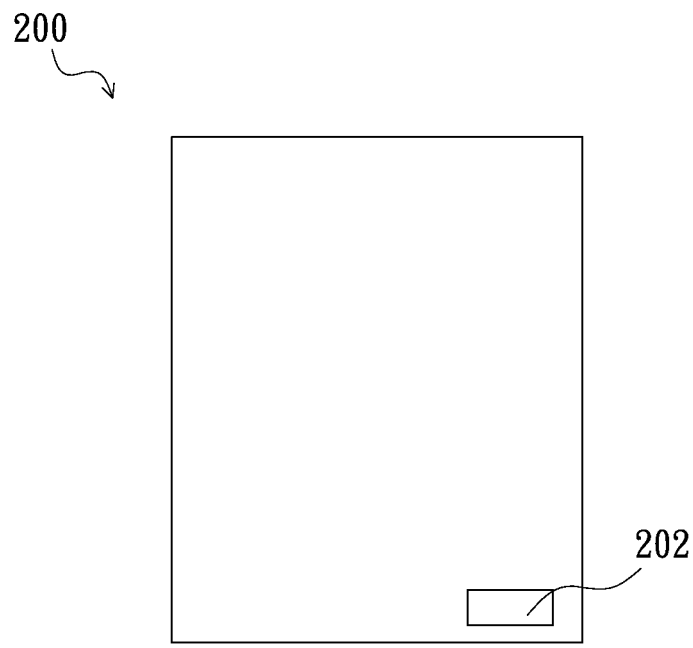
FIG. 3 is a schematic view of an electrophoretic display device in accordance with a second embodiment.
Figure 4:
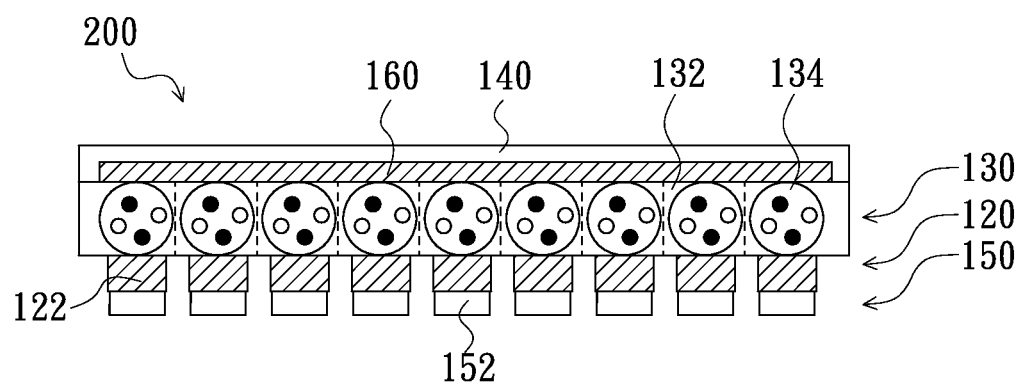
FIG. 4 is a cross-sectional, schematic view of an electrophoretic display device in accordance with a second embodiment.

FIG. 3 is a schematic view illustrating an electrophoretic display device in accordance with a second embodiment. An electrophoretic display device 200 includes a button 202. Further, referring to FIG. 4, the electrophoretic display device 200 is similar to the electrophoretic display device 100 in the first embodiment except that the electrophoretic display device 200 further includes a bottom electrode layer 150 and a top photoconductive layer 160 and the gap between the photoconductive units 122 is not filled with the dielectric material. The bottom electrode layer 150 can be made of a transparent conductive material such as indium tin oxide. The bottom electrode layer 150 includes a number of electrically conductive portions 152 corresponding to the photoconductive units 122 respectively. Each of the photoconductive units 122 corresponds one of the electrically conductive portions 152. The electrically conductive portions 152 are electrically connected to a controlling circuit (not shown).

The top photoconductive layer 160 can be made of a material as the same as the material of the photoconductive layer 120, and is formed on a top surface of the electrophoretic displaying layer 130. The top electrode layer 140 covers the top photoconductive layer 160 and is electrically connected to the controlling circuit. That is, the electrophoretic displaying units 134 of the electrophoretic displaying layer 130 and the top electrode layer 140 is separated by the top photoconductive layer 160.

The electrophoretic display device 200 has at least the following advantages:

Firstly, because the existence of the top electrode layer 140 and the bottom electrode layer 150, regardless the photoconductive layer 120 and the top photoconductive layer 160 are electrically conductive or insulating, an electric field can be formed between two opposite sides of the electrophoretic displaying layer 130. The electric filed between the top electrode layer 140 and the bottom electrode layer 150 can be controlled by the controlling circuit. Thus, the electric filed can be controlled to be less than a minimum electric field that is capable of driving the electrophoretic displaying units 134. At the same time, a bottom of the photoconductive layer 120 can be irradiated by the light beam 110 having a predetermined pattern. Because the photoconductive units 122 of the photoconductive layer 120 that are irradiated by the light beam 110 transform from the insulators into the electrical conductors, the electric filed between the electrically conductive photoconductive units 122 is increased and is adequate to drive the corresponding electrophoretic displaying units 134 to change in display state. What the electrophoretic display device 200 displays can be erased by applying a high voltage between the top electrode layer 140 and the bottom electrode layer 150. The erasing operation can be achieved by the button 202. In other words, when a user presses the button 202, the controlling circuit applies a high voltage between the top electrode layer 140 and the bottom electrode layer 150 to perform the erasing operation.

Secondly, the stronger the light intensity of the environment light is, the lower the electrical resistance of the top photoconductive layer 160 is. Thus, the electric field between two opposite sides of the electrophoretic displaying layer 130 is increased. As a result, the electrophoretic displaying layer 130 still has clear display effect.

Additionally, in the present embodiment, the bottom electrode layer 150 is electrically connected to the controlling circuit, and the photoconductive layer 120 is not electrically connected to the controlling circuit. However, in other embodiments, the bottom electrode layer 150 and the photoconductive layer 120 can be respectively connected to the controlling circuit. It can be controlled to have no voltage applied to the bottom electrode layer 150 when the electrophoretic display device 200 displays an image. Thus, the electrophoretic display device 200 can be driven using a driving method similar to the electrophoretic display device 100 of the first embodiment to display. When a user presses the button 202, a high voltage is applied between the bottom electrode layer 150 and the top electrode layer 140 to perform the erasing operation.

Figure 5:
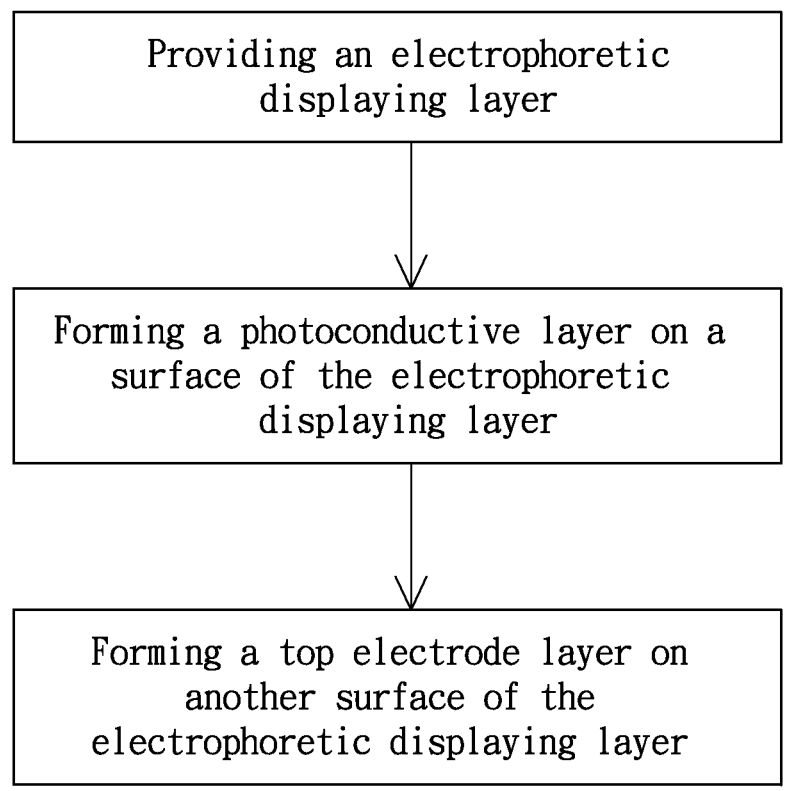
FIG. 5 is a flow chart of a method for manufacturing an electrophoretic display device.

FIG. 5 is a flow chart of a method for manufacturing an electrophoretic display device. Referring to FIGS. 1 to 3, at first, an electrophoretic displaying layer 130 is provided. The electrophoretic displaying layer 130 includes a number of pixels 132. In the present embodiment, each of the pixels 132 includes an electrophoretic displaying unit 134.

Thereafter, a photoconductive layer 120 is formed on a surface of the electrophoretic displaying layer 130. The photoconductive layer 120 includes a number of photoconductive units 134 spaced apart from each other. The photoconductive units 122 correspond to the electrophoretic displaying units 134 one by one. The method for forming the photoconductive layer 122 includes depositing a layer of photoconductive material such as 2,4,7-trinitron-9-fluorenone on a transparent substrate 120a such as a glass substrate. Then, the photoconductive units 122 are formed by a lithography and etching process. Optionally, the gap between the photoconductive units 122 can be filled with the dielectric material 124.

Afterwards, a top electrode layer 140 130 is formed on another surface of the electrophoretic displaying layer 130. The electrophoretic displaying layer 130 includes a number of pixels 132, the photoconductive layer 120 includes a number of photoconductive unit 122. Each of the pixels 132 corresponds to at least one of the photoconductive units 122.

In summary, the electrophoretic display device 100/200 of the present invention utilizes the light beam 110 to indirectly control the electrophoretic displaying layer 130 to display. The driving method is very simple. Compared with the electrophoretic display device using the thin film transistor array, the contrast is higher. In addition, the display controlling elements such as the thin film transistor array is omitted in the electrophoretic display device 100/200, the electrophoretic display device 100/200 becomes simpler and thinner While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electrophoretic display device, comprising:
   an electrophoretic displaying layer comprising a plurality of pixels;
   a top electrode layer;
   a photoconductive layer; and
   a bottom electrode layer formed beneath the photoconductive layer, the bottom electrode layer comprising a plurality of conductive portions corresponding to the photoconductive units of the photoconductive layer respectively, wherein the top electrode layer and the photoconductive layer are respectively disposed at two opposite sides of the electrophoretic displaying layer, the photoconductive layer comprises a plurality of photoconductive units spaced apart from each other, and each of the pixels corresponds to at least one of the photoconductive units.

2. The electrophoretic display device as claimed in claim 1, wherein the top electrode layer is a transparent electrode layer.

3. The electrophoretic display device as claimed in claim 1, further comprising:
   a top photoconductive layer disposed between the top electrode layer and the electrophoretic displaying layer.

4. The electrophoretic display device as claimed in claim 1, wherein a gap between two adjacent photoconductive units of the photoconductive units is filled with a dielectric layer.

5. The electrophoretic display device as claimed in claim 1, further comprising a transparent substrate, the photoconductive layer being formed on the transparent substrate.

6. The electrophoretic display device as claimed in claim 1, further comprising a button configured for controlling an erasing operation to erase what the electrophoretic display device displays.

7. A method for manufacturing an electrophoretic display device, comprising:
- providing an electrophoretic displaying layer comprising a plurality of pixels, the electrophoretic displaying layer having two opposite surfaces;
- forming a photoconductive layer on one surface of the two opposite surfaces of the electrophoretic displaying layer, the photoconductive layer comprising a plurality of photoconductive units spaced apart from each other, each of the pixels corresponds to at least one photoconductive units;
- forming a top electrode layer on the other surface of the two opposite surfaces of the electrophoretic displaying layer; and
- forming a bottom electrode layer beneath the photoconductive layer, the bottom electrode layer comprising a plurality of conductive portions corresponding to the photoconductive units respectively.

8. The method as claimed in claim 7, wherein the top electrode layer is a transparent electrode layer.

9. The method as claimed in claim 7, further comprising forming a top photoconductive layer on the other surface of the two opposites surfaces of the electrophoretic displaying layer before forming the top electrode layer.

10. The method as claimed in claim 7, further comprising filling a gap between two adjacent photoconductive units of the photoconductive units with a dielectric material.

11. The method as claimed in claim 7, wherein the photoconductive layer is formed on a transparent substrate.

12. A method for driving an electrophoretic display device, comprising:
- providing an electrophoretic display device comprising:
- an electrophoretic displaying layer comprising a plurality of pixels;
- a top electrode layer;
- a photoconductive layer; and
- a bottom electrode layer formed beneath the photoconductive layer, the bottom electrode layer comprising a plurality of conductive portions corresponding to the photoconductive units of the photoconductive layer respectively, the top electrode layer and the photoconductive layer being disposed at two opposite sides of the electrophoretic displaying layer, the photoconductive layer comprising a plurality of photoconductive units spaced apart from each other, each of the pixels corresponds to at least one photoconductive units; and
- irradiating the photoconductive layer with a light beam having a predetermined pattern so that a part of the photoconductive units irradiated by the light beam transforms into electrical conductors to drive the corresponding pixels to display a predetermined image.

* * * * *